United States Patent

Maki et al.

[11] Patent Number: 5,452,135
[45] Date of Patent: Sep. 19, 1995

[54] ALL-DIRECTIONAL OPTICAL SENSOR APPARATUS

[75] Inventors: Kimio Maki, Tokyo; Mayumi Nakamura; Tomoyuki Katoh, both of Kanagawa; Yasushi Noda, Tokyo, all of Japan

[73] Assignee: Sony Corporation, Japan

[21] Appl. No.: 989,381

[22] Filed: Dec. 11, 1992

[30] Foreign Application Priority Data

Dec. 24, 1991 [JP] Japan .................................. 3-341370

[51] Int. Cl.[6] .................. G02B 17/04; G02B 5/08; G01J 1/04; G01J 5/08
[52] U.S. Cl. .................................. 359/834; 359/833; 359/855; 359/613; 359/725; 250/342; 250/343
[58] Field of Search ............... 359/855, 868, 833, 613, 359/602, 601, 726, 727, 728, 725, 834; 250/342, 353

[56] References Cited

U.S. PATENT DOCUMENTS

| | | | |
|---|---|---|---|
| 2,176,554 | 10/1939 | Hardy | 359/728 |
| 2,244,235 | 6/1941 | Ayres | 359/725 |
| 3,383,511 | 5/1968 | Palser | 359/728 |
| 3,505,465 | 4/1970 | Rees | 359/725 |
| 3,777,160 | 12/1973 | Bernt | 250/370.1 |
| 3,984,178 | 10/1976 | Bergqvist | 359/726 |
| 4,271,359 | 6/1981 | Herwig et al. | 250/342 |
| 4,514,631 | 4/1985 | Guscott | 250/342 |
| 4,778,996 | 10/1988 | Baldwin et al. | 250/342 |
| 5,227,632 | 7/1993 | Armstrong et al. | 250/221 |

FOREIGN PATENT DOCUMENTS

| | | |
|---|---|---|
| 220356 | 2/1990 | Japan . |
| 1155544 | 4/1967 | United Kingdom ............... 359/725 |

*Primary Examiner*—Jon W. Henry
*Attorney, Agent, or Firm*—Ronald P. Kananen

[57] ABSTRACT

An all-directional optical sensor apparatus 8 includes an all-directional prism 20 which has a cylindrical-shaped body with a hollow-out cone section formed in its top surface 22. The surface 28 of the cone works as a reflector 30 for rays received through side surfaces 24 of the cylindrical-shaped body. An optical sensing element is disposed adjacent to a bottom surface 26 of the prism 20. A roof plate 40 having a dimension larger than the top surface 22 of the prism is arranged for shielding the entry of any light other than an input signal into an upper portion of the prism 20.

5 Claims, 8 Drawing Sheets

ALL-DIRECTIONAL OPTICAL SENSOR APPARATUS

BACKGROUND

1. Field of the Invention

The present invention relates to an optical sensor apparatus, in particular to an optical sensor apparatus for infrared radiation for use in electronics equipment such as a video tape recorder or a portable camcorder with a wireless remote commander.

2. Background of the Invention

FIG. 6 shows an all-directional optical sensor apparatus which has been used for the electronics equipment. The sensor apparatus includes a sensor portion 10 and an all-directional prism 20 arranged above it. As shown in FIG. 8, the sensor portion 10 has a sensor surface 12 which receives the rays through the all-directional prism 20.

The sensor surface 12 is formed by a sensor element such as a photo-diode, so that, among the rays of incidence to the whole sensor apparatus, only the rays received by the sensor surface 12 can be transformed into an electric signal. This all-directional sensor apparatus can be applied as a sensor apparatus for detecting the infrared radiation from a wireless remote commander, so that the electrical output signal can be generated by receiving the infrared radiation as an input signal.

FIGS. 7A and 7B show an all-directional prism which has been used in the sensor apparatus. The all-directional prism 20 is made of, for example, a light transmissible resin having a polygon post shape with a hollow cone formed in a top surface. In an example shown in FIGS. 7A and 7B, an octagon post having a top surface 22, a bottom surface 26 and eight side surfaces 24 is formed with an octagon cone formed in the top surface 22. The octagon cone surface 28 work as a reflector 30. The preferable solid angle of octagon cone is 90 degrees as shown in FIG. 7B.

FIG. 8 shows optical paths of rays received by the all-directional optical sensor apparatus. The rays received through side surfaces 24 of the all-directional prism 20 are reflected by the reflector 30 and then become incident on the sensor surface 12 of sensor portion.

FIG. 9 and FIG. 10 respectively show other examples an all-directional prism 20. The example shown in FIG. 9 has a cylindrical post with a hollowed-out section in the shape of a circular cone having a solid angle of 90 degrees. The other example shown in FIG. 10 has a cube with an octagon trapezoidal cone formed in a top surface. The octagon trapezoidal cone is made of a bottom surface 28A and eight cone surfaces 28. Each of the cone surfaces 28 works as a reflector 30 for rays passed through the side surfaces 24 the all-directional prism 20.

In electronics equipments for both indoor and outdoor uses, such as a camcorder, the above mentioned optical sensor apparatus is controlled by a wireless remote commander with the use of infrared radiation. When using the equipment outdoor with the wireless remote commander using the infrared remote control signal, the area for remote control operation in its outdoor use becomes smaller than in its indoor use. The sun beam causes this problem so that the sensitivity of the optical sensor apparatus with the infrared radiation may be worsened. Therefore an effective distance for the remote control signal from the remote commander to reach at the optical sensor becomes shortened.

Improvements have been made by putting a silver colored film on the cone surface 28 in FIG. 8 in order to shield the optical sensor apparatus from the sun beam or light. The optical sensor will then receive only the signal rays of infrared radiation from the wireless remote commander. The film can be put on the cone surface 28 which is forming an inner surface of the hollow in the all-directional prism 20. With the placement of the film, the sun beam 34 may be excluded from entering into an upper portion of the prism 20 and only the signal rays 32 may be received through the side surfaces 24 of prism 20.

However, the placement of the film on the cone surface 28 cannot completely exclude the sun beam from entering the upper portion of the prism. Consequently, the effective distance has been still restricted for the infrared radiation as an input signal from the wireless remote commander.

SUMMARY OF THE INVENTION

It is, therefore, an object of the present invention to provide an optical sensor apparatus in which the entry of light other than the input signal can be excluded.

It is another object of the present invention to provide an optical sensor apparatus in which the effective distance of wireless remote control with the infrared radiation can be extended in outdoor use.

In one aspect of the present invention, an all-directional optical sensor apparatus 8 comprises an all-directional prism 20 which has a cylindrical-shaped body with a hollow-out cone section formed in its top surface 22. The surface 28 the cone works as a reflector 30 for rays received through side surfaces 24 of the cylindrical-shaped body. An optical sensing element is disposed adjacent to a bottom surface 26 of the prism 20. A roof plate 40 having a dimension larger than the top surface 22 of prism is arranged for shielding the entry of any light other than an input signal into an upper portion of the prism 20.

In accordance with the present invention, a roof plate 40 is put on the top surface an all-directional prism 20 in the optical sensor apparatus 8. Since the roof plate 40 has a dimension larger than the top surface 22 of prism 20, its projecting rim 42 works as eaves of a roof so that any light other than the input signal cannot reach the upper portion of prism 20. As a result, only rays through the side surfaces 24 of prism 20 can be received and other light, such as sun beams, are excluded from entering into the upper portion of prism 20. The effective distance of wireless remote control can be therefore extended even when the optical sensor apparatus is located outdoors.

BRIEF DESCRIPTION OF THE DRAWING

The invention will be more readily understood with reference to the accompanying drawings, wherein.

DESCRIPTION OF THE INVENTION

Figure 1:
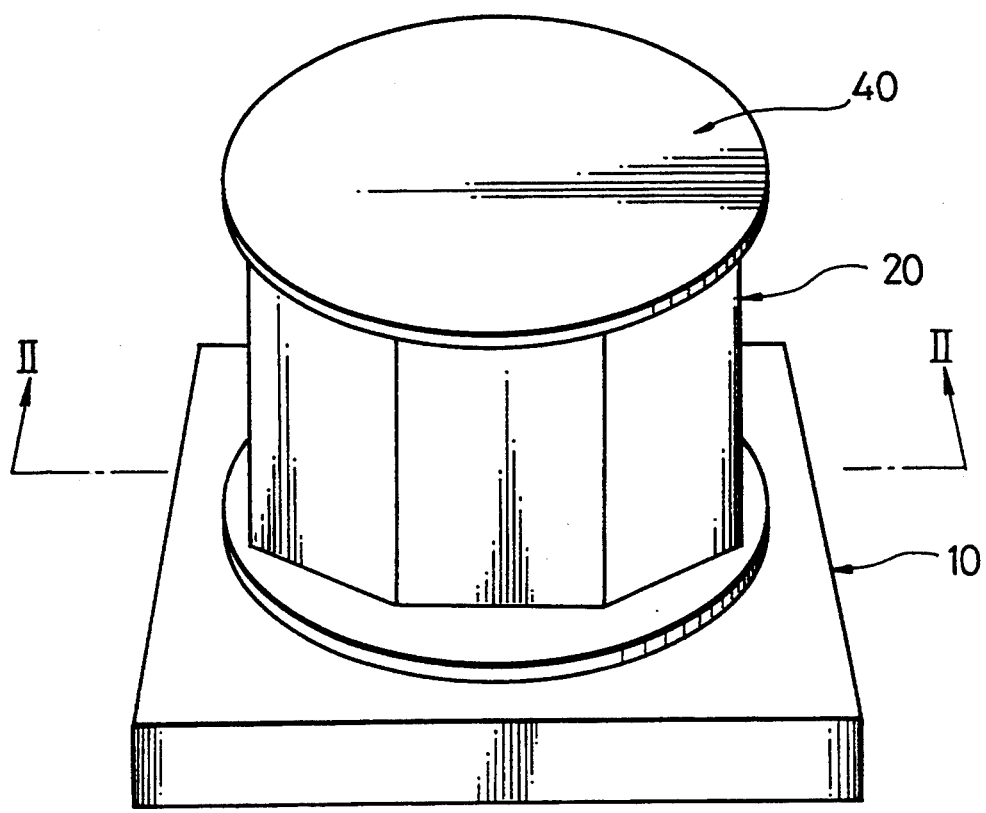
FIG. 1 shows a general view of an all-directional optical sensor apparatus in an embodiment of the present invention.

The embodiments of the present invention will be explained in detail by referring to FIGS. 1 to 5. In these drawings, the same reference numerals are utilized as shown in FIGS. 6 to 9 so far as the same portions are referred.

FIG. 1 shows an all-directional optical sensor apparatus in an embodiment of the present invention. The sensor apparatus comprises a sensor portion 10, an all-directional prism 20 disposed on the upper surface of the sensor portion 10, and a roof plate 40 which is attached on a top surface 22 of the prism 20. Compared with the optical sensor apparatus which has been used and explained with reference to FIG. 6, a difference with the sensor apparatus of FIG. 1 is the attached roof plate 40, though the same all-directional prism 20 can be utilized.

Figure 2:
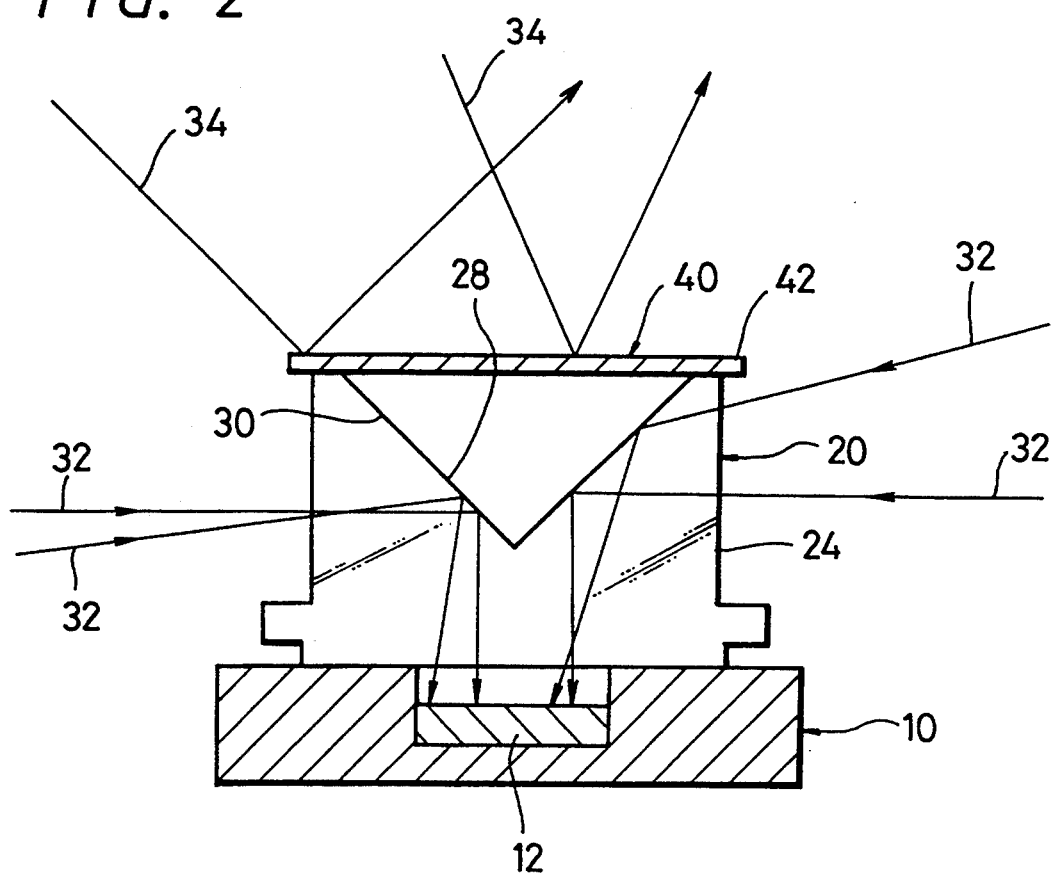
FIG. 2 shows a sectional view of FIG. 1 represented with optical paths of received rays.

FIG. 2 shows optical paths of rays received by the all-directional optical sensor apparatus. The signal rays 32 received through the side surfaces 24 the prism 20 are reflected off of the reflector 30 and are then directed to the sensing surface 12 of the sensor portion 10. Any light 34 other than the signal rays which enters the upper portion of the prism 20 can be shielded by the roof plate 40 and therefore cannot reach the sensing surface 12.

Because the roof plate 40 has a dimension lager than the top surface 22 of the prism 20, a projecting rim 42 is formed at the periphery of roof plate 40. The projecting rim 42 works as eaves a roof so that any light can be effectively shielded towards the upper portion of prism 20.

Though it is necessary to make the dimension of roof plate 40 larger than the top surface of prism 20 for the projecting rim 42 to function as the eaves of a roof, the light received through the side surface of prism may be interrupted and the effective distance of wireless remote control may be therefore narrowed if the projecting rim 42 is made too large. The roof plate 40 is made of an appropriate such as plastics, which does not allow the light to pass through.

Figure 3:
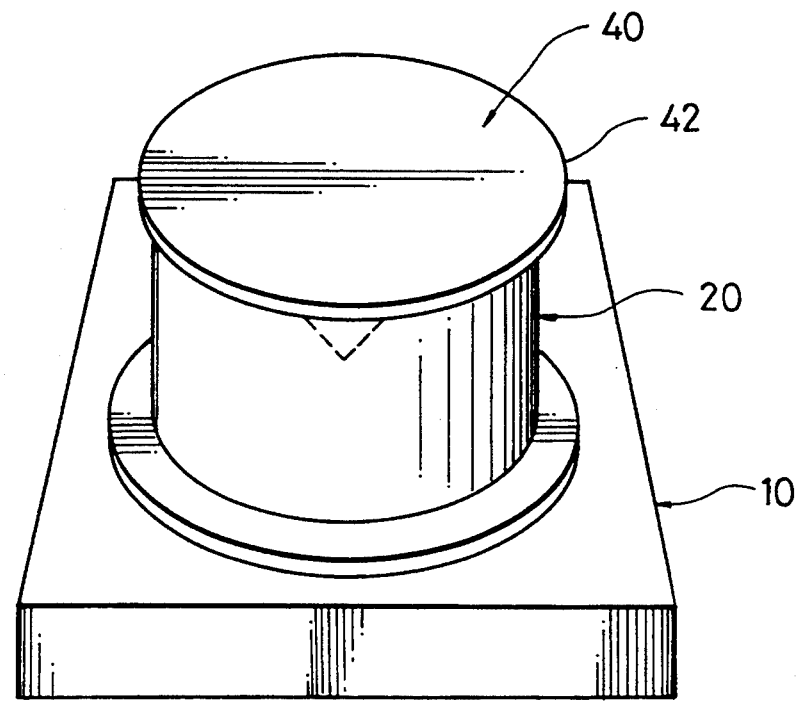
FIG. 3 shows a general view of an all-directional optical sensor apparatus in another embodiment of the present invention.

FIG. 3 shows another embodiment of the present invention, in which the roof plate 40 is attached to the top surface 22 of the prism 20, though the cylindrical all-directional prism 20 of FIG. 9A has been used. In this embodiment as well as the embodiment shown in FIGS. 1 and 2, the roof plate 40 has a dimension lager than the top surface 22 of the prism 20 and a projecting rim 42 is formed at the periphery of the roof plate 40. The projecting rim 42 works as eaves of a roof so that light can be effectively shielded towards the upper portion of prism 20.

Next, the method and result of experimentation will be disclosed by the inventors to determine the most appropriate dimension value of the roof plate 40 in order to increase the effective distance for the remote wireless signal.

Figure 4A:
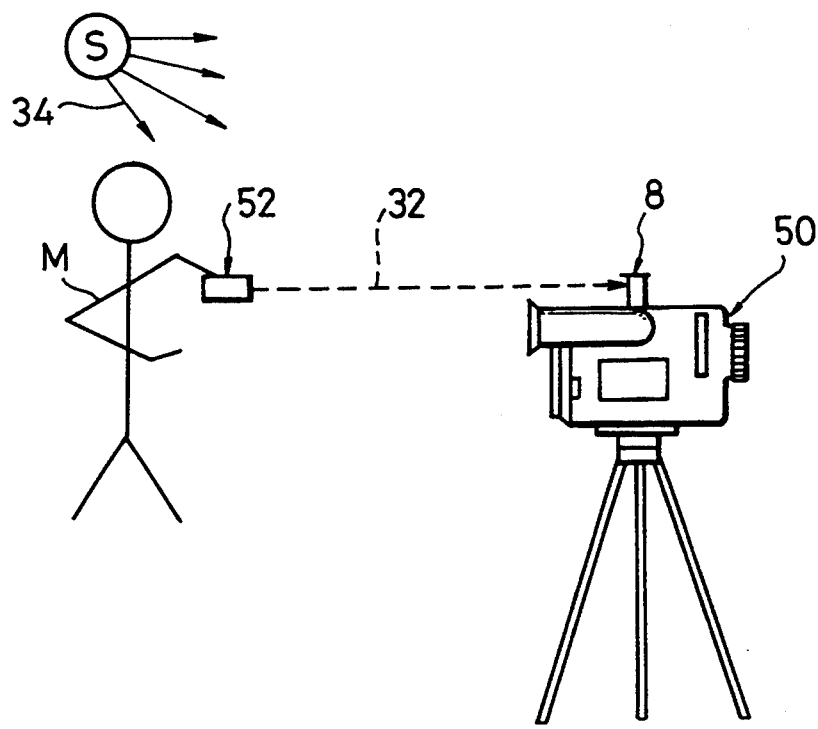
FIGS. 4A, 4B, 5A and 5B are drawings explaining how the experimentation has been conducted for confirming the effect of the present invention.
Figure 4B:
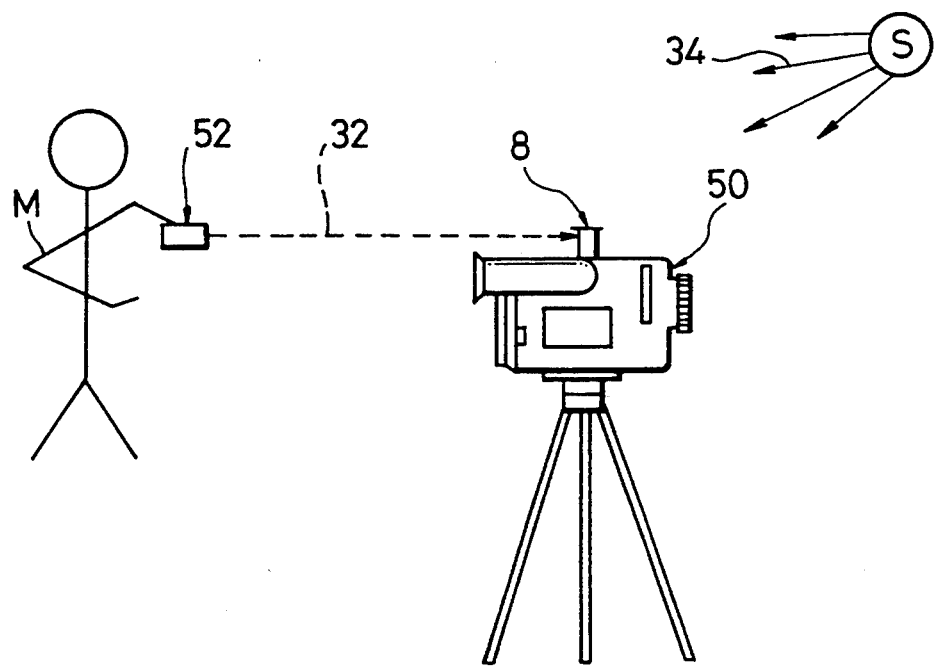

FIGS. 4A and 4B are general views which explains how to conduct the experimentation. The all-directional optical sensor apparatus 8 is incorporated in the camcorder 50 as an infrared radiation sensor apparatus for the wireless remote control. The all-directional optical sensor 8 is preferably deposed at the upper part of camcorder 50 so as to make the roof plate 40 horizontal and the side surface of prism 20 perpendicular to the upper surface of camcorder 50. With this arrangement, the infrared ray 32 emitted as an input signal from the commander 52 can be received by the sensor 8 under control of a user M.

By varying the dimension of the roof plate 40 in this arrangement, the effective distance has been measured for the infrared ray 32 as a remote control signal. The all-directional prism 20 utilized in this arrangement has an octagon post configuration with an octagon core formed from in the top surface as shown in FIG. 5. The diameter (D) of the octagon post is 11 mm. Five different disk were prepared and utilized as roof plates 40, one of which has the exact same configuration and dimension of the top surface of prism 20, and each of others has a slightly larger diameter. The sizes of the five disks are respectively D=12 mm, D=14 mm, D=15 mm and D=16 mm.

The experimentation was conducted outdoors and indoors by sending the infrared ray 32 from the commander 52 located behind the camcorder 50 to the all-directional optical sensor apparatus 8. In particular for the outdoor experimentation, two arrangements were adopted, one with the sun behind the user M as shown in FIG. 4A and one with the sun in front of the user M as shown in FIG. 4B, to investigate any effect on the infrared ray 34 from sun (S) as the disturbance against an effective distance the remote control signal.

Figure 5A:
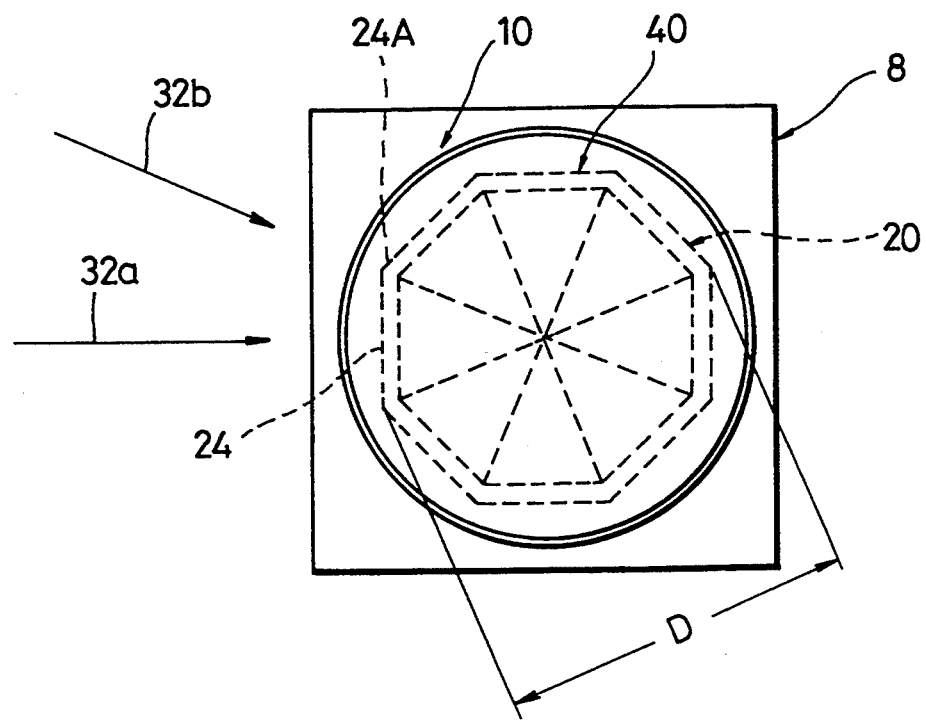

FIG. 5 represents the direction and angle of the infrared rays 32 as remote control signals toward the all-directional prism 20 which were actually utilized by the experimentation. As shown in FIG. 5A, in a common horizontal plane, an arrow 32a represents an infrared ray 32a which comes perpendicular to the side surface 24 and another arrow 32b represents another infrared ray 32b which comes through a corner 24A towards the center of the octagon prism 20.

When the experimentation was conducted outdoors, the all-directional optical sensor apparatus 8 was located so that the infrared ray from the commander 50 can be received only along the direction of the arrow 32a. On the other hand, when the experimentation was conducted indoors, the location of all-directional optical sensor apparatus 8 had been varied so that the infrared rays from the commander can be received along the directions of both arrows 32a and 32b.

Figure 5B:
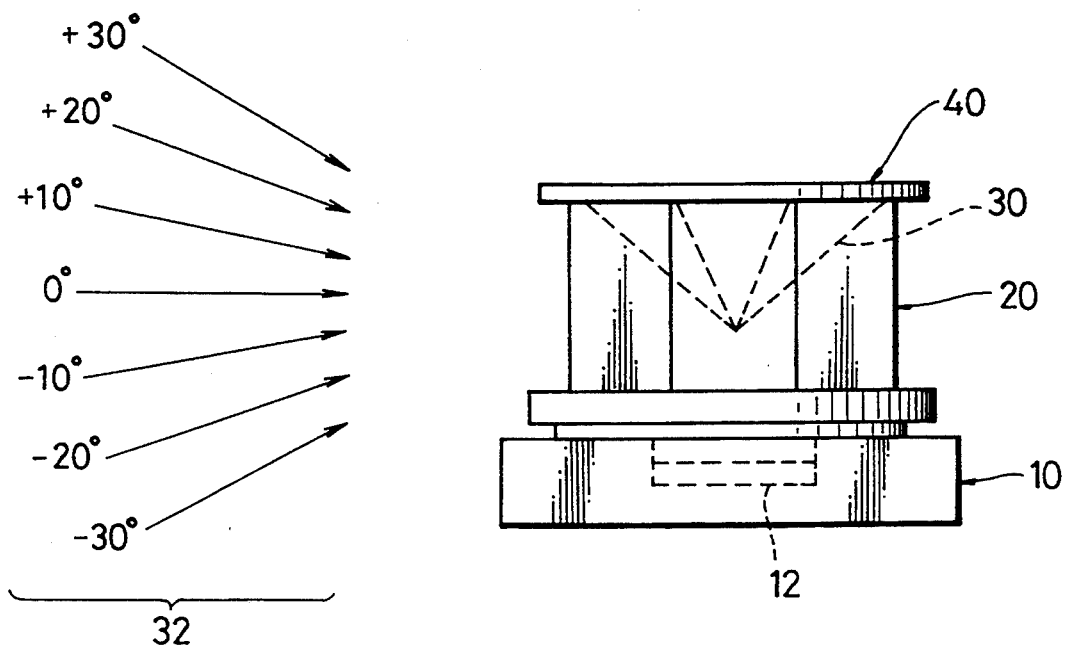
Figure 6:
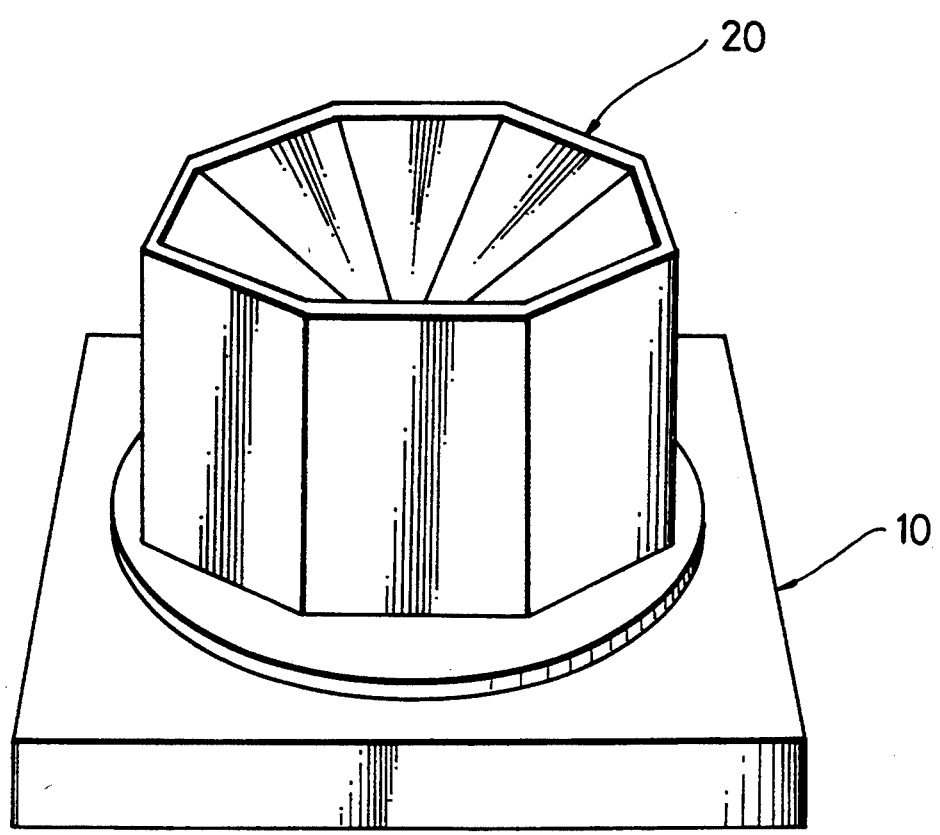
FIG. 6 shows a general view of an all-directional optical sensor apparatus which has been used with electronics equipment.
Figure 7A:
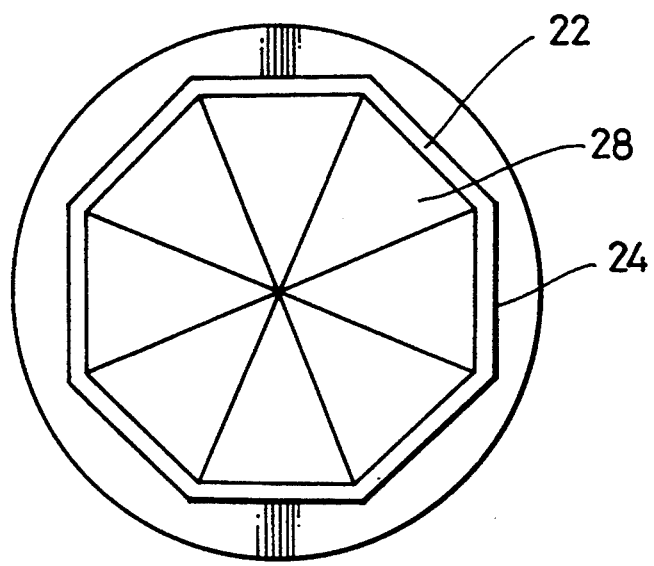
FIGS. 7A and 7B show a top view and a partial cross-sectional side view of the apparatus shown in FIG. 6.
Figure 7B:
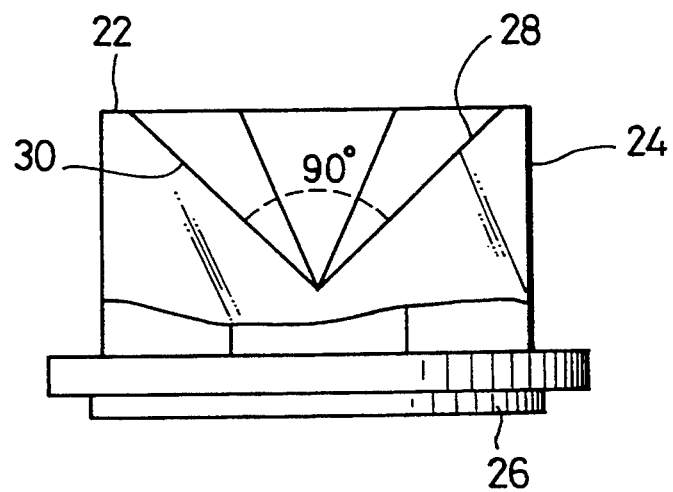
Figure 8:
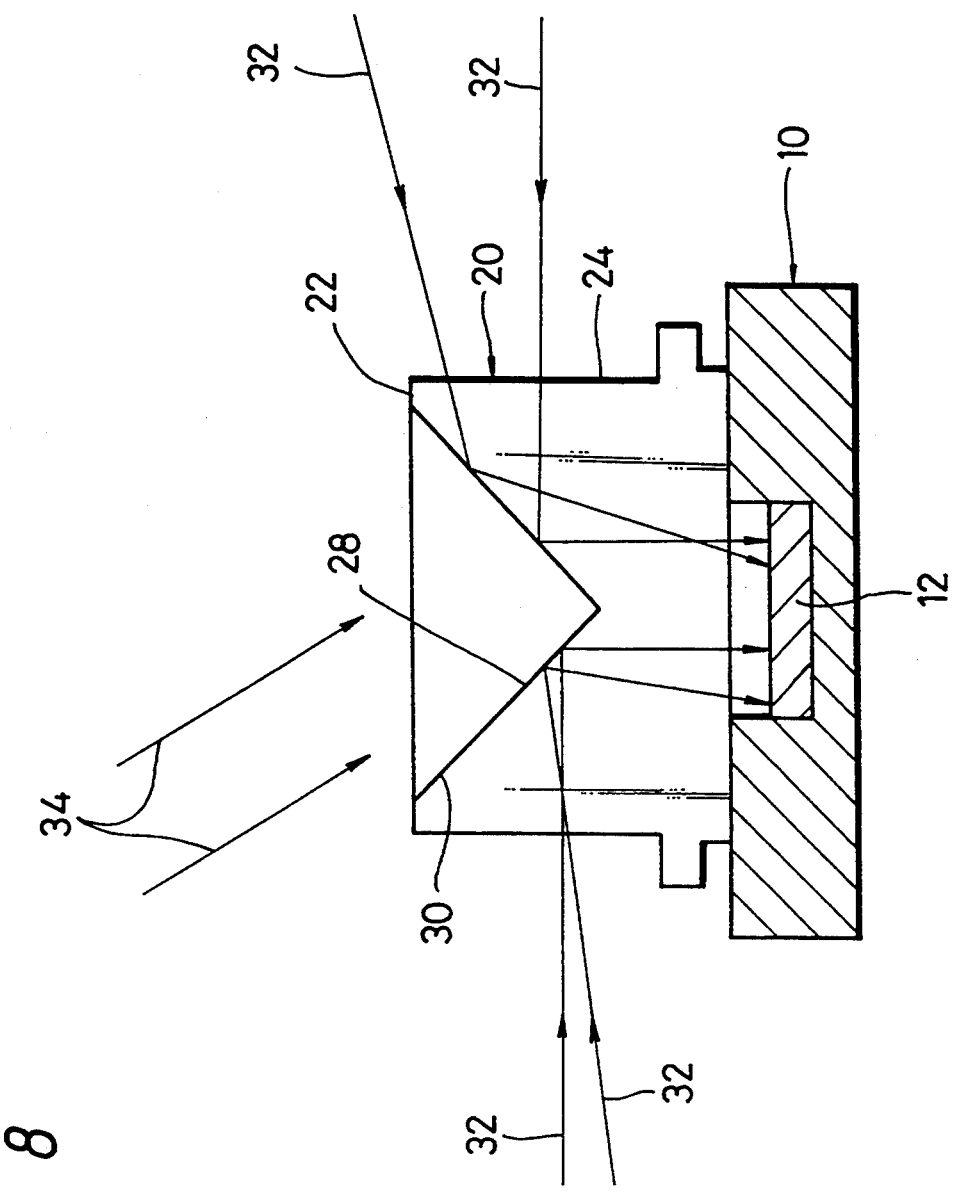
FIG. 8 shows a sectional view of FIG. 6 represented with optical paths of received rays.
Figure 9:
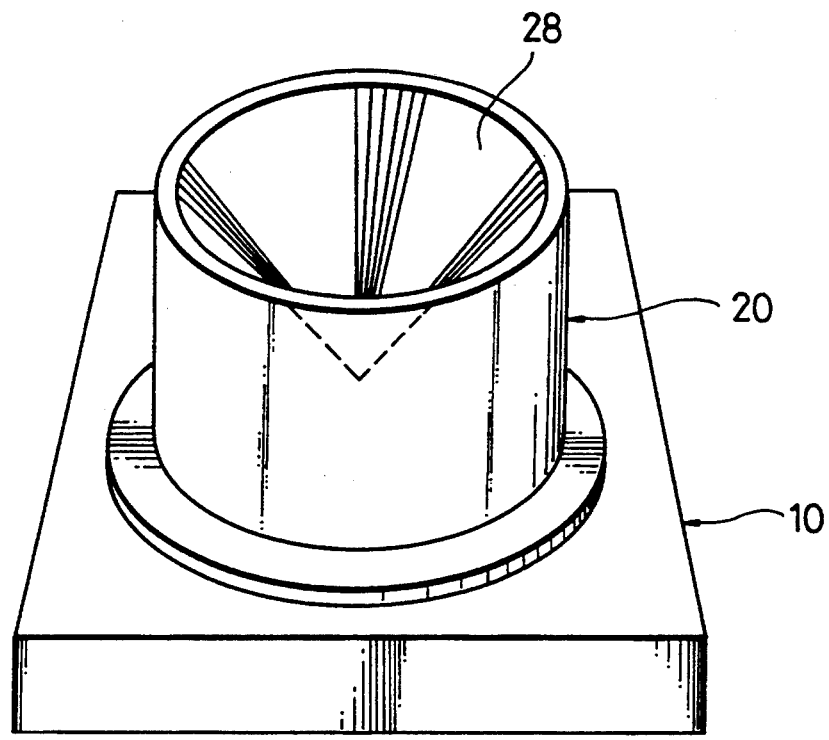
FIG. 9 shows a general view of a second all-directional optical sensor apparatus which has been used with electronics equipment.
Figure 10:
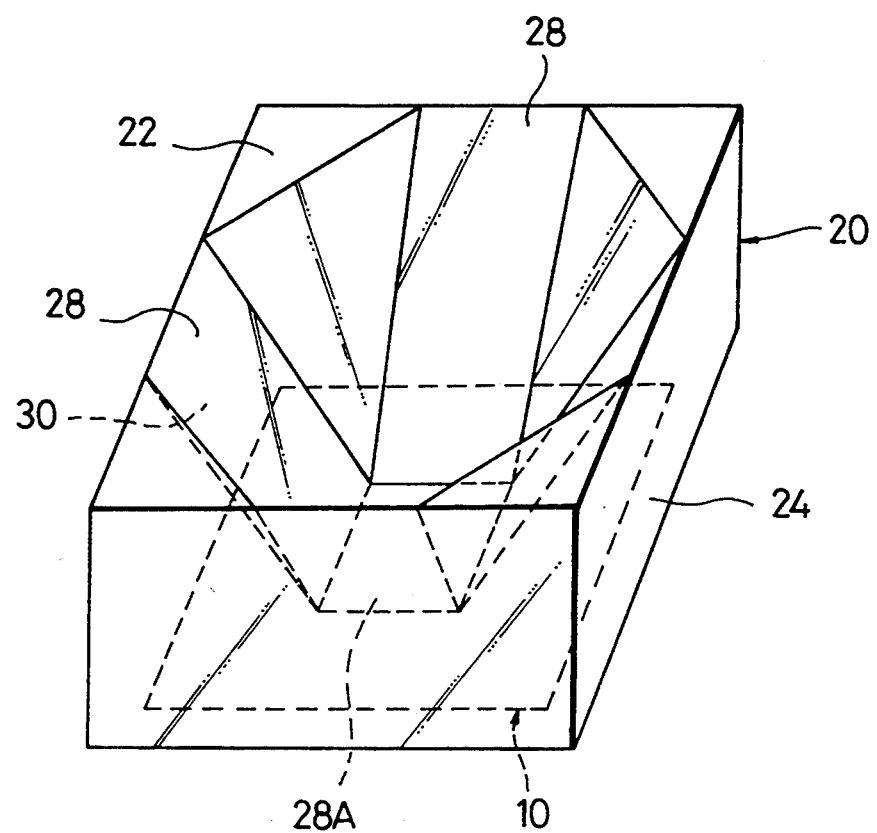
FIG. 10 shows a general view of still a third all-directional optical sensor apparatus which has been used with electronics equipment.

FIG. 5B represents varied angles of the infrared rays 32 in the same perpendicular plane toward the optical sensor apparatus 8. As shown by the arrows, against the horizontal level the angles of rays 32 were varied in angles such as +30, +20, +10, 0, −10, −20 and −30 degrees.

The result of the experimentation will be described below with reference to TABLES 1 to 3. The values in TABLES 1 to 3 represent the effective distance (meter) the remote control signal with the infrared ray under the following conditions.

TABLE 1

[A] Indoor experimentation
[B] Diameter (D) of roof plate 40 varied 11 to 16 mm
[C] Angle ( ) of infrared ray 32 varied from +30 to −30 degrees
[D] When D = 11 mm, configuration of roof plate 40 is the same as the upper surface 22 of prism 20, and direction of infrared ray varied along the arrows 32 (a) and 32 (b) as shown in FIG. 5A
[E] When D = 12, 14, 15 or 16 mm, configuration of roof plate 40 in a circular disk

| | (degrees) | | | | | | |
|---|---|---|---|---|---|---|---|
| D(mm) | +30 | +20 | +10 | 0 | −10 | −20 | −30 |
| 11(a) | 8.0 | 14.5 | 16.5 | 13.0 | 7.5 | 7.0 | 6.0 |
| 11(B) | 8.0 | 8.0 | 11.5 | 11.0 | 8.0 | 6.5 | 6.5 |
| 12 | 7.5 | 11.5 | 15.0 | 13.5 | 9.5 | 6.0 | 7.5 |
| 14 | 8.5 | 11.5 | 15.0 | 13.5 | 10.5 | 6.0 | 6.5 |
| 15 | 8.0 | 12.0 | 16.0 | 15.0 | 10.5 | 7.5 | 7.0 |
| 16 | 6.0 | 6.5 | 13.5 | 13.0 | 9.5 | 6.5 | 7.0 |

TABLE 2

[A] Outdoor experimentation with the sun behind the user M
[B] Diameter (D) of roof plate 40 and Angle ( ) of infrared ray 32 varied as same as in TABLE 1
[C] When D = 11 mm, direction of infrared ray 32 is along the arrow 32(a) as shown in FIG. 5A

| | (degrees) | | | | | | |
|---|---|---|---|---|---|---|---|
| D(mm) | +30 | +20 | +10 | 0 | −10 | −20 | −30 |
| 11 | 3.0 | 3.5 | 5.0 | 2.5 | 1.0 | 0.5 | 0.3 |
| 12 | 1.0 | 2.5 | 4.0 | 4.0 | 3.5 | 1.5 | 0.5 |
| 14 | 2.0 | 2.0 | 5.5 | 5.5 | 4.0 | 1.5 | 0.5 |
| 15 | 2.5 | 3.0 | 6.0 | 5.5 | 4.5 | 2.5 | 0.5 |
| 16 | 1.0 | 3.0 | 4.0 | 5.5 | 4.5 | 2.0 | 0.5 |

TABLE 3

[A] Outdoor experimentation with the sun in front of the user M
[B] Diameter (D) of roof plate 40 and Angle ( ) of infrared ray 32 varied as same as in TABLE 1
[C] When D = 11 mm, direction of infrared ray 32 is along the arrow 32(a) as shown in FIG. 5A

| | (degrees) | | | | | | |
|---|---|---|---|---|---|---|---|
| D(mm) | +30 | +20 | +10 | 0 | −10 | −20 | −30 |
| 11 | 1.0 | 0.5 | 1.0 | 4.0 | 3.5 | 2.5 | 2.0 |
| 12 | 0.5 | 2.0 | 3.0 | 5.0 | 4.0 | 3.5 | 2.0 |
| 14 | 0.5 | 1.5 | 3.0 | 5.5 | 4.0 | 3.5 | 2.5 |
| 15 | 1.0 | 2.0 | 4.5 | 6.0 | 4.0 | 3.0 | 2.5 |
| 16 | 0.5 | 2.0 | 4.0 | 6.0 | 3.5 | 3.0 | 2.0 |

In accordance with the result of this experimentation, we can recognize that the effective distance of remote control signal can be extended by making the dimension of the roof plate 40 larger than the top surface of prism 20. However, it was also recognized that the effective distance may be shortened if the roof plate 20 had too large of a dimension.

The present invention can exclude environmental disturbances, such as those caused by sun beams or lighting, and therefore, only the signal ray can be received by the optical sensor apparatus 8. As a result, an effective distance of remote control signal can be extended in the wireless remote control with the infrared ray commander and sensor apparatus.

While specific embodiments of the invention have been shown and disclosed, it is to be understood that numerous changes and modifications may be made by those skilled in the art without departing from the scope and intent of the invention.

What is claimed is:

1. An all-directional optical sensor apparatus, comprising:
    a prism having a cylindrical-shaped body with a hollowed-out cone section formed on a top surface, a surface of said cone operating as a reflector for rays received through side surfaces of said cylindrical-shaped body;
    an optical sensing element disposed adjacent to a bottom surface of said prism; and
    a roof plate having a dimension larger than said top surface of said prism for shielding any light other than an input signal from entering through an upper portion of said prism.

2. An all-directional optical sensor apparatus according to claim 1, wherein said roof plate has a circular disk configuration with peripheral edges of said circular disk configuration extending beyond said cylindrical-shaped body of said prism.

3. An all-directional optical sensor apparatus according to claim 1, wherein said prism has a cylindrical body and said hollowed-out section is in the shape of a circular cone.

4. An all-directional optical sensor apparatus according to claim 1, wherein said prism has an octagon body and said hollowed-out section is in the shape of an octagon cone.

5. An all-directional optical sensor apparatus according to claim 1, wherein a diameter of said roof plate is 10% to 60% larger than a diameter of said top surface of said prism.

* * * * *